INVENTOR.
SHALE J. NISKIN

March 12, 1968

S. J. NISKIN 3,372,585

DEVICE FOR RECORDING CURRENT VELOCITY AND DIRECTION IN BODIES OF WATER

Filed Feb. 17, 1966

INVENTOR.
SHALE J. NISKIN
BY
Lloyd J. Andres

March 12, 1968

S. J. NISKIN 3,372,585

DEVICE FOR RECORDING CURRENT VELOCITY
AND DIRECTION IN BODIES OF WATER

Filed Feb. 17, 1966

INVENTOR.
SHALE J. NISKIN
BY
Lloyd J. Andres

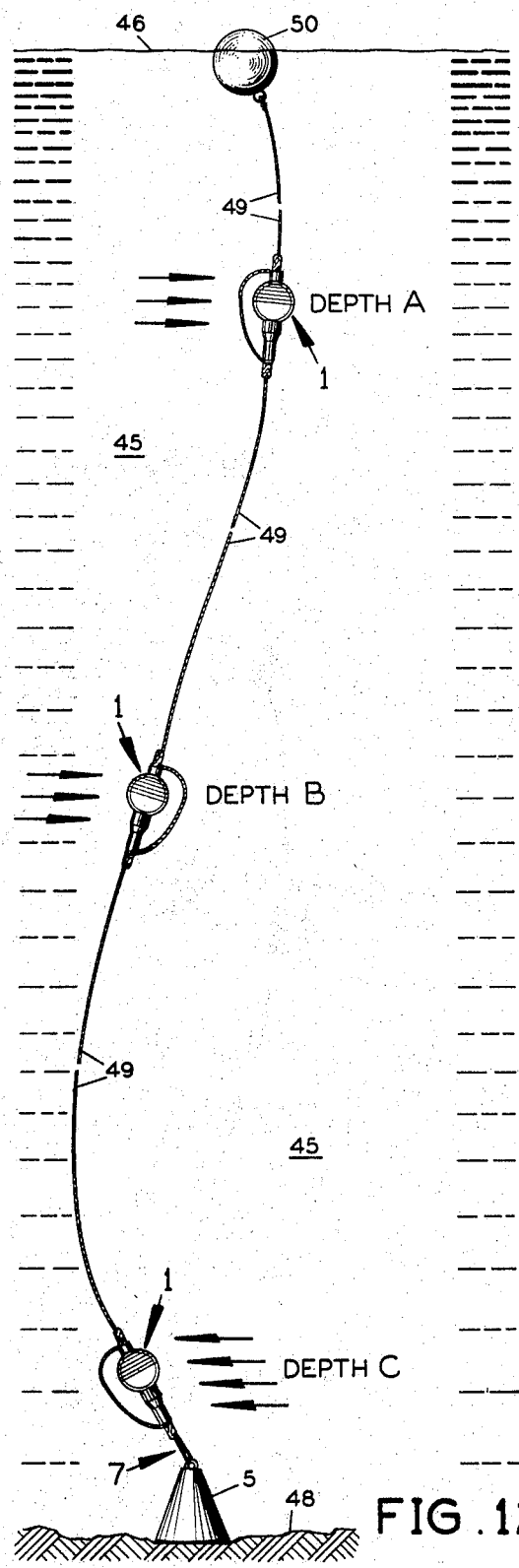
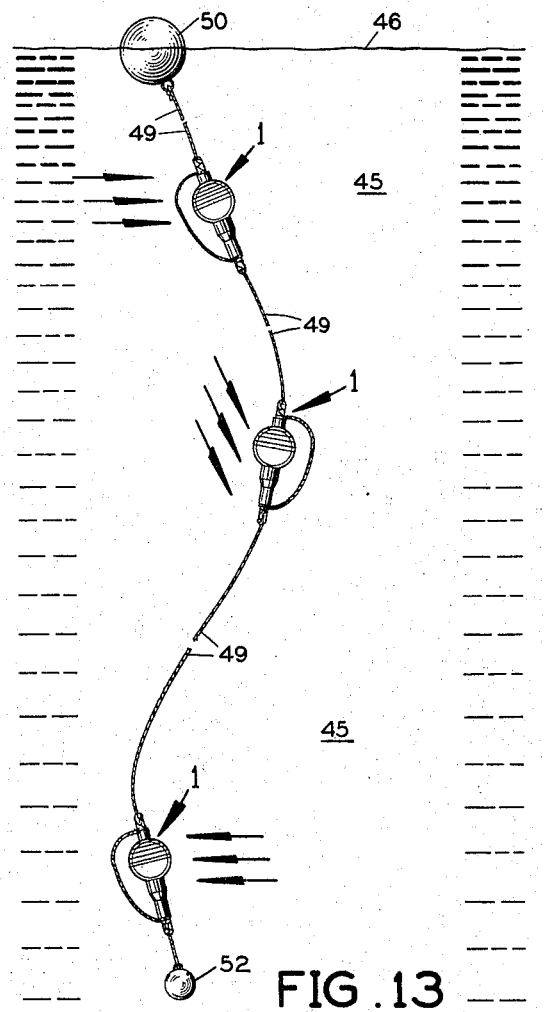
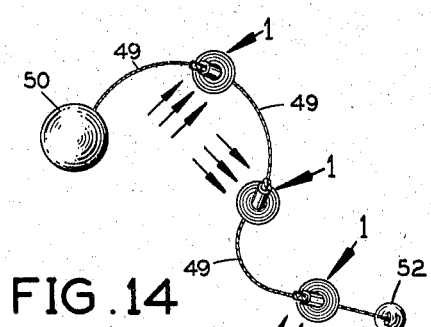
FIG. 12
FIG. 13
FIG. 14
INVENTOR.
SHALE J. NISKIN

United States Patent Office 3,372,585
Patented Mar. 12, 1968

3,372,585
DEVICE FOR RECORDING CURRENT VELOCITY AND DIRECTION IN BODIES OF WATER
Shale J. Niskin, 9400 SW. 63 Court, Miami, Fla. 33156
Filed Feb. 17, 1966, Ser. No. 528,222
11 Claims. (Cl. 73—170)

ABSTRACT OF THE DISCLOSURE

A device for the automatic measurement and recording of water currents at various predetermined depths comprising a frame carrying a freely rotatable sphere which is submerged to the test depth. The rotatable sphere assumes a given vertical and azimuthal position. After a predetermined time the sphere is locked in position with respect to the frame and the device is retrieved.

---

This invention relates in general to the subject of hydraulics and more particularly to the subject of hydro kinetics and a related device for recording the velocity and direction of the flow of water currents, which device is particularly useful in the field of oceanography for the automatic measurement and recording of the water currents at various predetermined depths, including the bottom of a waterway or ocean.

Prior devices for the measurement and recording of submarine water currents including those that are surface captive are expensive, inaccurate and difficult to operate, particularly since the geographic reference point is usually vessel subject to various azimuthal movements difficult to control.

The present invention overcomes the above objections and disadvantages by the provision of a relatively simple, low cost sensing device for automatically accurately measuring and recording the velocity and direction of water currents, which device will retain a recording at a predetermined location without correction for the movement of a reference craft or boat because of the absence of a physical connection between the device and the user's craft, the construction of which is a principal object of the invention.

Another object of the invention is the provision of a sensing device for indicating the velocity of currents in a body of water by the provision of an elongated chamber adapted to be secured by the lower end thereof in a body of water and having a free moving indicator therein of predetermined buoyancy and loading for normally assuming a vertical position when said chamber is flooded including soluble means for locking the indicator within said chamber for retaining the angular position of the chamber with respect to the indicator when the former is tilted by a current in the water.

A further object of the invention is the provision of a sensing device for determining the direction of flow of currents in a body of water with reference to polar coordinates comprising a chamber adapted to be secured by the lower end thereof in said body of water and subject to tilting by a current therein including a free moving indicator within said chamber having therein permanent magnet means for normally rotating said indicator to a north-south direction with respect to the tilt of said chamber and also including a soluble release means whereby said chamber may be locked with respect to said indicator for recording the direction of flow of current in a body of water.

These and other objects in two embodiments of the invention are shown and described in the following specification and drawings, in which:

FIG. 12 illustrates the device shown in FIG. 1 secured to a line for simultaneously recording independent measurements of velocity and direction in a body of water at a plurality of different depths and anchored to the bottom of the body of water.

FIG. 13 illustrates a plurality of the device shown in FIG. 1 spaced along a line retained by a float on the surface of said body of water for measuring the velocity and direction of currents in the body of water at predetermined different depths.

FIG. 14 illustrates the elements shown in FIG. 13 in relative positions when viewed from above said body of water.

Figures 1, 2, 3, 4:
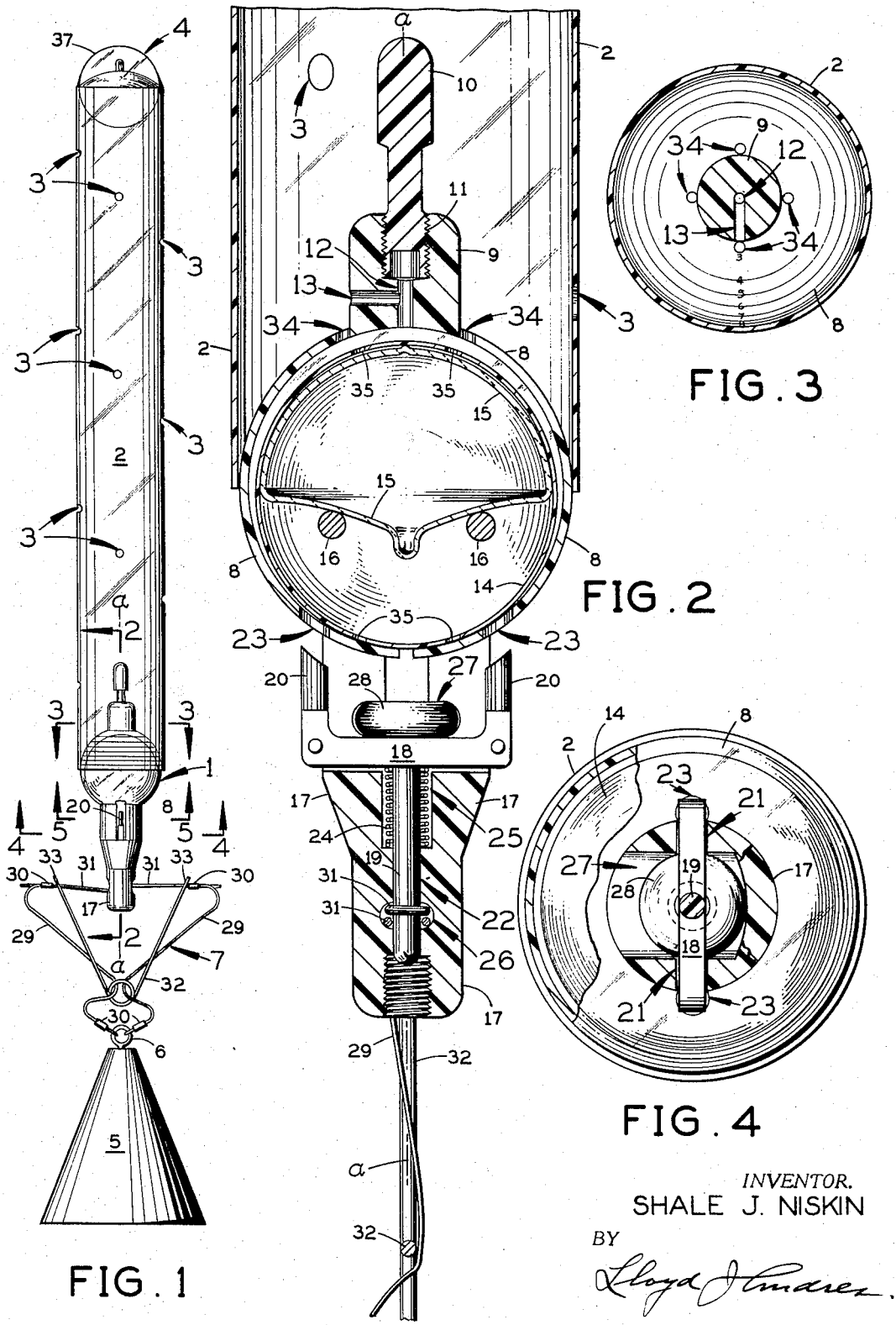
FIG. 1 is a side elevation of a device for measuring and recording the velocity and direction of the flow of water at the bottom portion of the body thereof.
FIG. 2 is an enlarged fragmentary cross sectional view taken through section line 2—2, FIG. 1.
FIG. 3 is an enlarged cross sectional plan view taken through section line 3—3, FIG. 1.
FIG. 4 is an enlarged bottom cross sectional view taken through section line 4—4, FIG. 1.

Referring to FIG. 1, a combination sensing and recording assembly 1, to be hereinafter described, is coaxially secured in the lower end of an elongated cylindrical tube 2, preferably, but not necessarily, made from transparent material, such as an acrylic plastic. The tube is provided with a plurality of holes 3 through the wall thereof for flooding the interior thereof when submerged. A hollow transparent float assembly 4, also preferably of acrylic material, is generally spherical in shape and secured in the upper end of tube 2 by well known mechanical or adhesive means, as shown. A conical weight 5 of dense material, such as metal or concrete, is provided with an anchor ring 6 at the apex thereof and anchor ring assembly 7, to be hereinafter described, which is releasably retained in the lower end portion of the recording assembly 1, as shown. Thus when the entire device is released in water the weight will overcome the buoyancy of the float assembly 4 and gravitate to the bottom of the body of water for a measurement period.

Referring to FIG. 2, the sensing and recording assembly comprises a transparent hollow spherical casing 8 forming a spherical cavity therein and includes an integral cylindrical boss 9 extending from the upper end thereof. A cylindrical anchor pin 10 has threads 11 at one end and is engaged with like coaxial threads in boss 9. A coaxial bore 12 in boss 9 forms a junction with a cross bore 13 therein completing a passageway into the interior of casing 8. The entire assembly is preferably made of acrylic or similar plastic material.

A hollow indicating sphere 14 has a wall of substantially uniform thickness and an outside diameter less by a predetermined small distance than the inside diameter of the casing 8 for providing clearance for the free rotational movement of the sphere within casing 8. A closed hollow buoyancy chamber 15 is secured within indicator 14 by well known adhesive means in order to provide predetermined buoyance of the sphere when submerged in water of predetermined density, to be hereinafter described.

Figure 7:
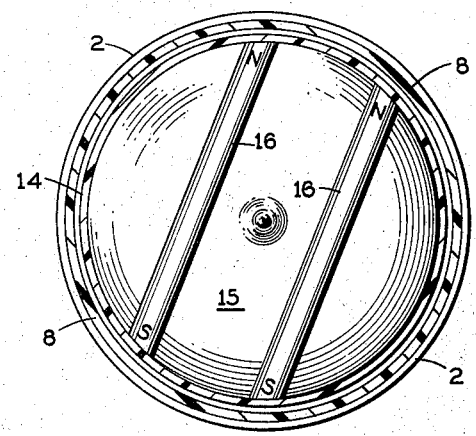
FIG. 7 is a cross sectional bottom plan view taken through section line 7—7, FIG. 6.

A pair of bar magnets 16 are secured to the underside of chamber 15 in parallel relation by well known adhesive means, as shown, and have mating ends thereof magnetically poled alike, better shown in FIG. 7. The magnets serve the dual purpose of maintaining the sphere in a north-south projection about the axis thereof and providing ballast weight for maintaining the sphere 14 in vertical position about the axis thereof through the center thereof when in operation.

A cylindrical release housing 17 has the upper end thereof integral with or secured to casing 8 and in coaxial alignment with boss 9. A fork member 18 having an integral central cylindrical shaft 19 and a pair of cylindrical parallel projections 20—20 at the upper end thereof and oblique ends, as shown, with the spaced fork positioned for axial reciprocation in a transverse slot 21 and a coaxial bore 22 in housing 17, as shown in FIGS. 2 and 4.

A pair of circular clearance apertures 23—23 are provided for the free passage of the projections 20—20 through casing 8 for engaging the sphere 14 and moving same upward in secure frictional engagement with the upper inner surface of the casing.

Figure 8:
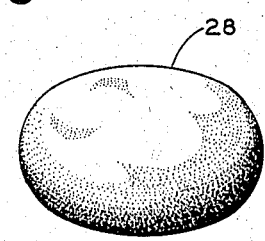
FIG. 8 is a perspective view of elements shown in FIGS. 2 and 6.

A compression coil spring 24 is loosely positioned in a counter-bore 25 coaxial with the bore 22 and bears against fork member 18, as shown in FIG. 2, for moving the latter upward and clamping the sphere 14 against movement in any direction within casing 8. The lower end portion of shaft 19 is dimensioned to intersect a transverse aperture 26 through the lower end portion of housing 17 when the fork member 18 is in its lower position. A trigger cavity 27 is transversely positioned in housing 17 adjacent the upper side of fork member 18 when the latter is in its lowermost position and positioned against the restraining action of spring 24 for receiving and retaining a water soluble trigger pellet 28 under the force of spring 24 with projections 20 held in their idle position, as shown in FIG. 2. One physical form of a water soluble pellet is illustrated in FIG. 8.

Referring to FIGS. 1 and 2, a pair of flexible like cords 29 are secured to ring 6 by loop-forming clips 30 and each cord 29 has a loop 31 formed in the upper end thereof retained by clips 30, as shown. When the device is in the measuring position and the pellet 28 in place, as shown in FIG. 2, a lower portion of the shaft 19 projects through both loops 31, as shown, which secures the housing 17 to the weight 5 for free angular movement. A torsion spring 32 terminates in a pair of eyes 33 which are tensioned against opposite clips 30 by the force of the spring, the operation of which will be hereinafter described.

It is to be noted that a plurality of holes 34 as well as the apertures 23 permit the free flow of water into the casing 8 and a plurality of holes 35 through the wall of sphere 14 permit the water to flow into sphere 14 in and around the buoyant chamber 15. The size of the chamber 15 is adjusted to provide sufficient buoyancy to substantially equal the weight of the sphere 14 and the elements contained therein when submerged in water of a predetermined density. Thus when the casing 8 is submerged, the sphere is substantially free to rotate and assume a vertical position about the vertical axis by virtue of the distribution of the weight of the magnets and the sphere will also assume a north-south direction by virtue of the poling of the north and south magnets with reference to the earth's magnetic poles.

For the purpose of establishing the azimuthal flow of currents the indicating sphere 14 is provided with the well known compass indices around the outer periphery thereof and a reference line in casing 2. In addition, a small cross on the upper side of the sphere indicates the center 36 or the vertical axis a—a of the sphere.

The transparent spherical casing 8 has inscribed about the upper half thereof a plurality of circles coaxial with the axis a—a of the device with said circles bearing indices corresponding with calibrated degrees of the declination of the axis from a true vertical position with reference to the true vertical center 36 on the sphere 14.

Figure 6:
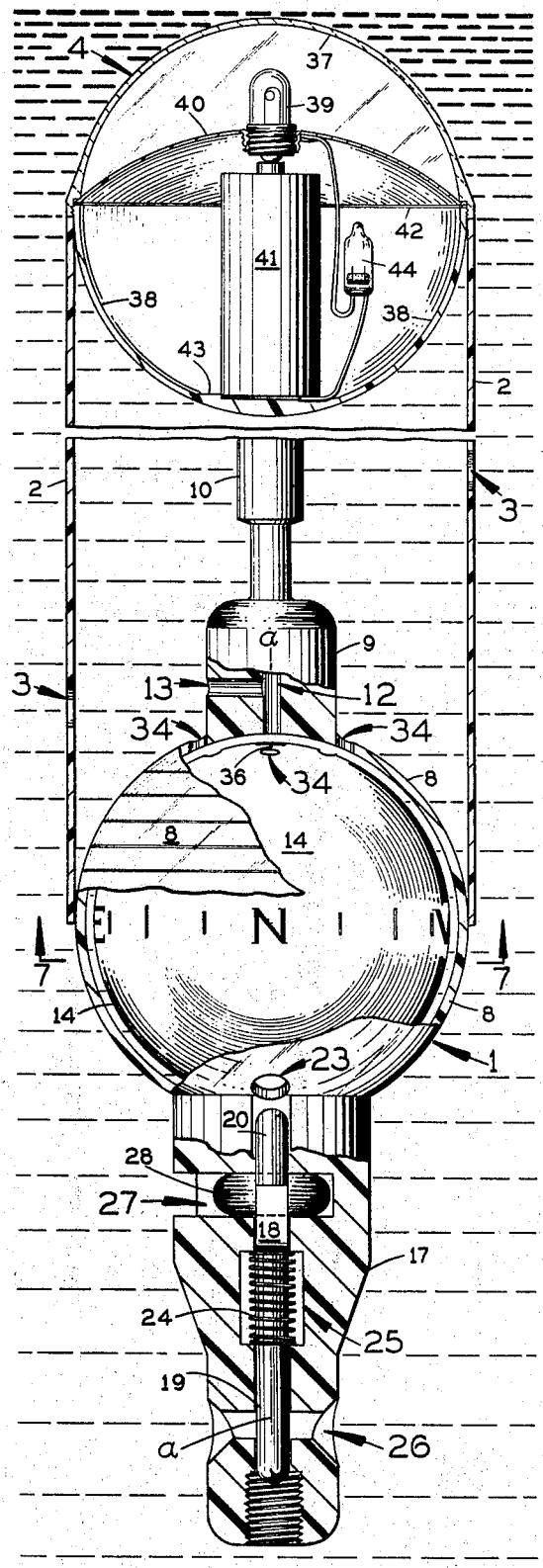
FIG. 6 is an enlarged fragmentary cross sectional view taken at right angles to that shown in FIG. 2.
Figure 5:
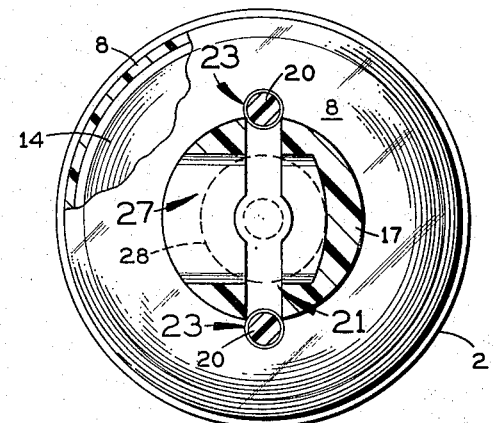
FIG. 5 is a bottom plan view taken through section line 5—5, FIG. 1.

Referring to FIG. 6, the float assembly 4 consists of two generally hollow hemispherical portions 37 and 38 which are demountably sealed together by well known means and secured in the upper end of tube 2. An electric lamp 39 is detachably secured in a socket-reflector 40 retained within the sphere, as shown. A battery 41 is removably retained in sphere 38 by a transverse disc 42 and an appropriate cavity in a base 32, as shown. A conventional mercury switch 44 has the terminals thereof connected to the socket 40 and one terminal of the battery 41. The central remaining terminal of the battery is urged into contact with the central terminal of the lamp by the socket-reflector 40. Thus when the sphere is in a near vertical position a circuit will be established from the battery to the lamp for lighting same and when the device is stored in inverted position the circuit is automatically opened by switch 44. It is to be noted that any one of several well known forms of switches, including a magnetic switch, may be substituted for the mercury switch for energizing the lamp 39 and maintaining the necessary hermetic closure of the float 4.

Prior to use, in practice the device is calibrated in known water currents to determine the angle of inclination of the tube 2 when immersed in currents of various known velocities. Thus the circular inscriptions from 3 to 8 inclusive, on spherical casing 8, shown in FIG. 10, may be calibrated to correspond with various velocities of water currents.

In practice, the device, as illustrated in FIG. 1, is dropped into a body of water for the purpose of determining the current flow in the bottom thereof and the weight 5 will overcome the buoyancy of float assembly 4 and gravitate the device to the bottom. The water will enter and fill tube 2 through a plurality of holes 3 and also enter holes 13 and 34 to fill the space within casing 8 surrounding the sphere 14 and enter the lower portion of sphere 14 through holes 35. Thus because of the predetermined partial buoyancy of sphere 14 and the magnets 16, the sphere is substantially free to rotate in any direction within casing 8 and assume a vertical position with center 36 upper most with the compass indices moving and aligning the sphere in north and south azimuth.

The flow of water or current along the bottom will impinge against tube 2 and tilt same to an angle corresponding with the velocity of the current encountered.

Following a predetermined period of time, the soluble pellet 28 in aperture 26 will dissolve and permit the spring 24 to rapidly move fork member 18 upward which will move projections 20 through aperture 23 and frictionally lock the sphere in vertical fixed relation to the tilted position of tube 2. Simultaneously, the shaft 19 will withdraw upward and release loops 31 therefrom and permit spring 32 to positively disengage the loops from housing 17, thus permitting the buoyancy of float assembly 4 to raise the entire device to the surface of the water where its visibility will be noted for recovery by the illumination of the lamp 39.

Figures 10, 11:
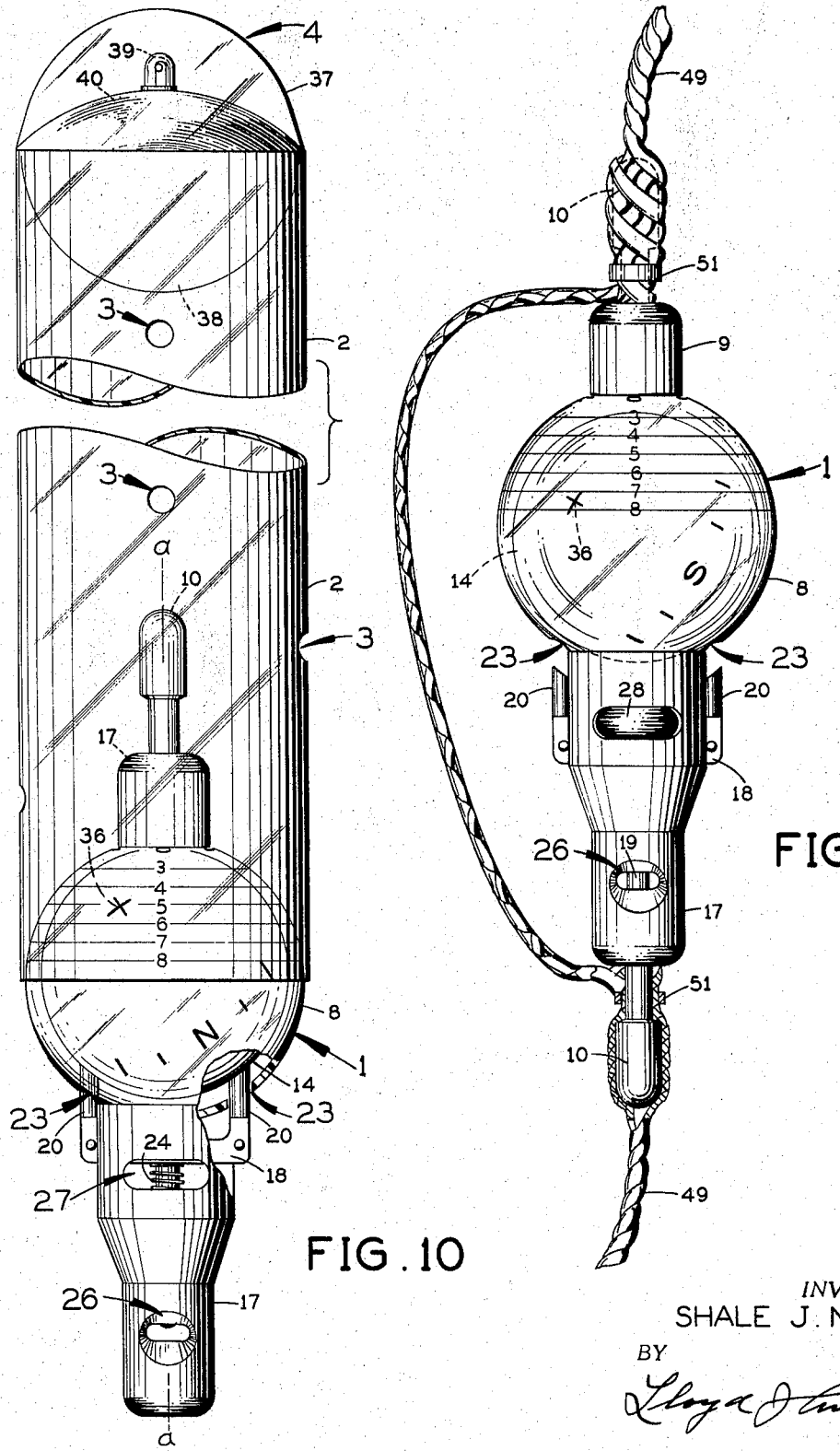
FIG. 10 is an enlarged fragmentary elevation of the device shown in FIG. 1 showing elements in recorded position.
FIG. 11 is a side elevation of the recording assembly shown in FIG. 10 secured to a line for measurements in predetermined depths of water.

When recovered, and referring to FIG. 10, the fixed recorded inclination of the sphere 14 in casing 8 and its fixed recorded relation to the compass index on casing 8 will indicate the velocity encountered by reference to calibration chart of the current at the bottom of the body of water and the azimuthal direction of the flow of current.

Figure 9:
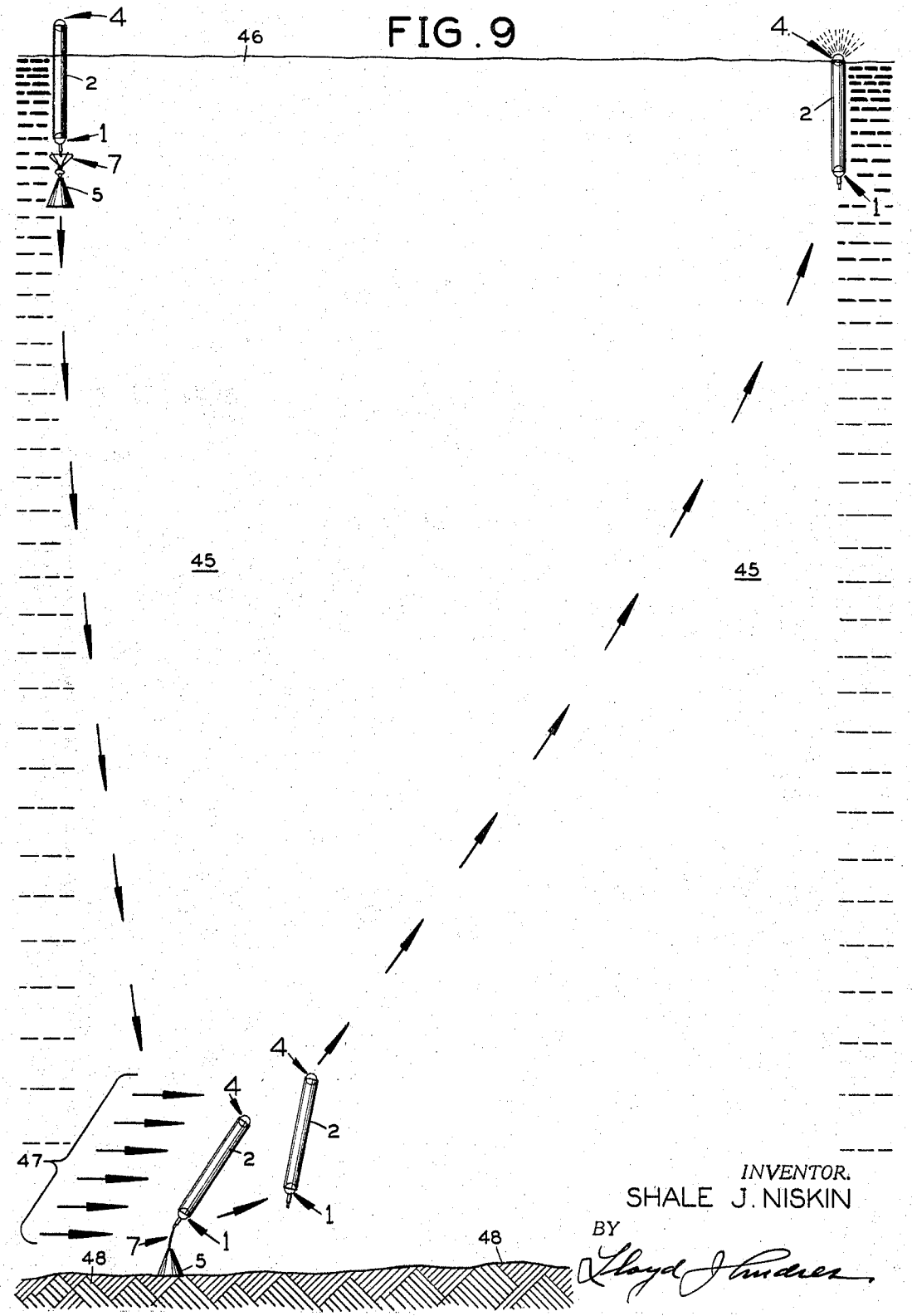
FIG. 9 is a diagrammatic illustration of the device shown in FIG. 1.

FIG. 9 illustrates a body of water 45 having a surface 46 in which currents near the bottom are flowing in the direction shown by multiple arrows 47 over a bottom 48. FIG. 9 also shows the gravity descent of the recording device contained in tube 2 which terminates in the upper end in a float assembly 4 and ultimately comes to rest with the weight 5 on the bottom and the tube 2 tilted at an angle resulting from the impingement of the current flowing along the lower portion of the body of water. FIG. 9 also shows the path of movement of the tube 2 following the recording of the direction and intensity of the aforesaid current and its path upward to the surface following the dissolution of the trigger pellet 28 which retained the tube to the weight for sufficient time to establish equilibrium. It is apparent that the illumination of the lamp 39 will aid in the recovery of the released tube in which the measurments are recorded, as illustrated in FIG. 10. The angle of rotation of the sphere 14 within the casing 8 will indicate the velocity of the current in the bottom portion of the body of water when interpreted by precalibration and the azimuthal direction of the current, indicated by the rotary position of the sphere 18 about its axis with reference to an index line on casing 8.

An alternate arrangement of the sensing device used in the tube 2, shown in FIG. 11 and previously described, is the simultaneous determination of the flow of water currents at a predetermined number of different depths in a body of water.

This is accomplished by securing a number of sensing units 1 to a line in spaced relation, such as indicated in FIG. 12, for measuring the direction and flow of currents at depths of A, B, and C, which are descended and retained at the bottom by an anchor weight 5 and retained to the lowermost sensing unit by a soluble pellet, as previously described, with a line 49 connecting the three sensing units shown to a float 50 with sufficient slack between the uppermost sensing unit and the surface to permit each sensing unit to establish an angle and direction corresponding to the deflection of each related portion of line motivated by the current encountered.

A preferred form of securing each sensing unit to a particular line requires the use of a second anchor pin threaded into the lower end of release housing 71 like the pin previously described in boss 9 with the line, which in effect is a hollow braid of synthetic material, such as nylon, which will permit the insertion of the upper and lower anchor pins 10 in any predetermined position along the line and may be fastened by simple well known clamps 51. Thus the position of the sensing unit may be readily changed to make measurements at a variety of different levels.

Since the pellet 28 is the same in each sensing unit the recording at different depths corresponding to the sensing unit will be made at substantially the same time and may be readily recovered by means of the float 50, as illustrated in FIG. 12.

It is to be noted that the pellet 28 may be made of a variety of materials, although a simple candy lozenge is satisfactory; however, it has been found that by coating the pellets with certain lacquers the dissolution time may be extended, particularly in the case of the lowermost sensing unit, shown at depth C in FIG. 12 in order to be certain that the measurements made by the sensing unit at depth A and B are complete prior to the release of the units from anchor weight 5.

An alternate method of measuring the velocity and direction of the flow of currents in a body of water in different depths is illustrated in FIG. 13 where the line 49 is supported by float 50 and permitted to assume various positions corresponding with the flow of currents at different depths with the addition of a small ballast weight 52 secured to the lower end of the line 49, as shown.

FIG. 14 illustrates a plan view of the configuration shown in FIG. 13, which results from currents at different depths moving in different directions in said body of water.

It is obvious that the recordings made by the sensing units in the different applications described must be calibrated with known currents in order to correctly interpret the various position readings of the indicating means in the sensing units.

It is understood that certain modifications in the construction, utilizing the features above described, are intended to come within the scope of the appended claims.

Having described my invention, I claim:

1. A sensing device for measuring and recording the flow of currents in a body of water comprising means forming a housing;
    said housing having a spherical cavity therein with a principal axis through the center of said cavity including a flooding aperture therethrough,
    a substantially cylindrical lower anchor projection integral with said housing and extending therefrom coaxial with respect to said axis,
    indices means around said housing positioned with respect to said axis,
    a spherical indicating float of predetermined buoyancy positioned for universal rotation in said cavity in close proximity to the inner spherical wall of said housing,
    a reference point on the surface of said float at the upper position of the axis of said float,
    ballast weight means in said indicating float positioned to urge same with the axis thereof into a vertical gravitational position,
    a flexible means secured to the outer portion of said anchor projection whereby said housing will flood and tilt about said flexible means with respect to the said vertical position of said float and position said reference point adjacent to a position on said indices means corresponding to a predetermined indicated velocity when said sensing device is positioned in a current flowing in a body of water and tilted thereby, and means for locking said float in its indicating position.

2. The construction recited in claim 1 wherein the said ballast weight comprises an elongated permanent magnetic means having north and south poles at opposite ends thereof,
    a compass indices around the periphery of said float in a plane normal to the axis thereof whereby said float will assume a north-south direction with respect to the position of said housing when the latter is submerged in said body of water and said cavity is flooded.

3. The construction recited in claim 1 including an operating member movably retained in said projection for movement from a first position to a second position including a spring means biased between said projection and said member for urging the latter into said second position,
    said projection having an anchor aperture therethrough intersecting said principal axis,
    said member adapted and constructed to intersect said aperture when in said first position,
    an anchor means for temporarily retaining said sensing device on the bottom of said body of water,
    a flexible anchor line secured to said anchor means terminating in a loop positioned in said anchor aperture and around said member when the latter is in its said first position,
    means for holding and releasing said member for movement from said first to said second position and releasing said member from said loop whereby said sensing device is released from said anchor means.

4. The construction recited in claim 1 including a locking projection on said operating member for movement through an aperture in said housing for engagement with and locking said float against the inner surface of said cavity when said member is moved from said first to said second position,
    a solid pellet adapted and constructed to dissolve in said body of water within a predetermined period of time, a second aperture in said projection normal to said axis for intersecting a portion of said member whereby the placement of said pellet in said second aperture engaged by said portion of said member will hold the latter in said first position and will permit the movement thereof to said second position when dissolved in said water for frictionally locking said float against the inner surface of said cavity in a measurement position with respect to said axis of said housing.

5. A sensing device for measuring and recording the flow of currents in a body of water comprising means forming a housing, indicating means retained for universal rotary movement in said housing for indicating the angle and direction of movement of said housing with respect to said indicating means when said housing is subject to a current in said body of water, said indicating means having a positive buoyancy in the top portion thereof and magnetic means to orient said indicating means, said housing including a projection extending therefrom having an axis substantially coaxial with the principal axis of said housing, a locking member movably retained in said projection for movement from a first to a second position, spring means biased between said projection and said member for urging the latter into said second position, an anchor aperture in said projection normal said axis intersected by a portion of said member when the latter is in said first position, an anchor of predetermined weight for temporarily retaining said housing at the bottom of said body of water, a flexible connector secured at one end to said anchor with a loop in the opposite end thereof positioned in said aperture and around a portion of said member when the latter is in said first position, a release aperture in said projection transverse said axis, a pellet means compounded to dissolve in said water following a predetermined period of time, said pellet means positioned in said release aperture and engaged with a second portion of said member for holding the latter in said first position, said member having at least one locking projection thereon extending through an aperture in said housing for engaging and frictionally securing said indicating means in said housing for holding the relative rotary displacement of said indicating means with respect to said housing whereby the dissolving of said pellet in said water will release said housing from said loop and permit said spring means to disengage said housing from said anchor and simultaneously release said member to move the latter and said locking projection into engagement with said indicating means for holding the relative position of the latter with respect to the housing.

6. An apparatus for measuring and recording the velocity and direction of the flow of a current in a body of water comprising a measuring and recording device responsive to angular and directional position with respect to the vertical when submerged in a current of water for indicating the velocity and direction of flow of said current thereof, an anchor of predetermined weight positioned for securing said apparatus for free movement thereof at the bottom of said body of water, a projection extending from the lower end of said device for retaining a combination anchoring and release means, an anchor-release member movably secured in said projection for movement from a first to a second position including a spring means biased between said projection and said member for urging the latter into said second position, a flexible linear means having one end secured to said anchor and the opposite end thereof adapted and constructed to releasably engage said member when the latter is in said first position for holding said device to said anchor for the free angular movement of said device, a pellet compounded to dissolve in said water within a predetermined period of time, an aperture in said projection intersecting the path of movement of a portion of said member for retaining said pellet in engagement with said portion for holding said member in said first position whereby said flexible linear means will be disengaged from said member by the movement of the latter from said first to said second position when said pellet is dissolved.

7. The construction recited in claim 6 including a second projection extending upward therefrom coaxial with said first mentioned projection, a flexible retaining line of uniform predetermined cross section secured to said lower end of said upper projections for moving said device to a predetermined angle and direction when said device and said line is subjected to said current.

8. The construction recited in claim 6 including a spring means retained and biased in said retaining line for normally urging the disengagement thereof from said member when released by the movement of said member from its said first to said second position.

9. An apparatus for measuring and recording the velocity and direction of the flow of a current in the bottom of a body of water, an anchor of predetermined weight positioned for securing said apparatus for free angular movement thereof in the bottom of said body of water, an elongated tube having perforations therein for flooding with said water when submerged therein, a measuring and recording device secured in the lower end of said tube, a magnetic indicator means retained in the lower end of said tube, said indicator means normally maintaining a vertical and north-south azimuthal position with respect to the angular and directional position of said tube and proportionate to the velocity and direction of said current, a projection extending downward from said measuring device coaxial with said tube, a hollow float member of predetermined buoyancy secured in the upper end of said tube, a flexible linear means secured to said anchor at one end thereof with the opposite end thereof terminating in a retaining means for positioning in said projection for holding said tube at the bottom of said body of water and free to be moved to an angular position by the said current therein, corresponding to the velocity and direction of said current, an operating member movably secured in said projection for movement from a first to a second position including spring means biased between said projection and said member for urging the latter into said second position, said retaining means of said flexible means engaged by said member when the latter is in its said first position, water soluble means in said projection for temporarily holding said member in said first position whereby the dissolving of said soluble means in said water will permit said member to move from said first to said second position and release said engaging means of said flexible means and permit said float member to raise said tube and said device to the surface of said body of water.

10. The construction recited in claim 9 including at least one projection extending from said operating member constructed and adapted to frictionally engage and hold said magnetic indicator in a vertical position with respect to the angular and azimuthal position of said tube when said soluble means is dissolved and said operating member moves from said first to said second position.

11. The construction recited in claim 10 including an electric lamp including a battery power source and circuit therefor in said float member for visually locating said tube when the latter rises from the bottom to the surface of said body of water.

References Cited

UNITED STATES PATENTS

| 1,773,808 | 8/1930 | Davis | 33—204 |
| 2,864,834 | 8/1949 | Taylor. | |
| 2,941,306 | 6/1960 | Uecker | 33—204 |
| 3,094,928 | 6/1963 | Costley et al. | |
| 3,203,236 | 8/1965 | Prince | 73—170(0) X |
| 3,293,676 | 12/1966 | Link | 73—170(0) X |

RICHARD C. QUEISSER, Primary Examiner.

JAMES GILL, Examiner.

J. W. MYRACLE, Assistant Examiner.